United States Patent [19]

Hobson, Jr.

[11] Patent Number: 6,051,138

[45] Date of Patent: Apr. 18, 2000

[54] SLACK FILTER TUBE WITH TENSIONING MEANS

[76] Inventor: Russell B. Hobson, Jr., Mill Creek Rd., Old Fort, N.C. 28762

[21] Appl. No.: 09/072,867

[22] Filed: May 5, 1998

[51] Int. Cl.[7] .................................................. B01D 24/00
[52] U.S. Cl. ...................... 210/323.2; 210/486; 210/495; 210/497.01; 210/356; 210/359; 55/379
[58] Field of Search .................................. 210/323.2, 457, 210/497.01, 497.1, 350, 352, 193, 383, 384, 385, 494.1, 486, 495, 356, 359; 55/475, 379

[56] References Cited

U.S. PATENT DOCUMENTS

| | | |
|---|---|---|
| Re. 24,136 | 4/1956 | Marvel . |
| 82,255 | 9/1868 | Simmons . |
| 673,398 | 5/1901 | Keller . |
| 707,811 | 8/1902 | Monjeau . |
| 1,040,342 | 10/1912 | Johnson . |
| 1,489,519 | 4/1924 | Chateau . |
| 1,741,705 | 12/1929 | Liddell . |
| 1,905,738 | 4/1933 | Norquist . |
| 1,928,670 | 10/1933 | McCrery ..................................... 55/300 |
| 1,935,136 | 11/1933 | Thibert . |
| 2,014,105 | 9/1935 | Dooley . |
| 2,035,758 | 3/1936 | Pierce . |
| 2,067,439 | 1/1937 | Dooley . |
| 2,145,047 | 1/1939 | Goldkamp . |
| 2,274,352 | 2/1942 | Wood . |
| 2,301,430 | 11/1942 | Malanowski ........................... 210/778 |
| 2,350,011 | 5/1944 | Black ...................................... 95/282 |
| 2,475,561 | 7/1949 | Cooperider . |
| 2,480,320 | 8/1949 | Carrier . |
| 2,480,653 | 8/1949 | Hoefer, Jr. . |
| 2,570,132 | 10/1951 | Koupal . |
| 2,788,129 | 4/1957 | Thompson . |
| 2,819,800 | 1/1958 | Goodloe . |
| 2,835,391 | 5/1958 | Bottum . |
| 2,934,209 | 4/1960 | Franck . |
| 3,055,290 | 9/1962 | Arvanitakis . |
| 3,065,856 | 11/1962 | Goldman . |
| 3,100,190 | 8/1963 | Hobson, Jr. . |
| 3,216,572 | 11/1965 | Kasten . |
| 3,219,072 | 11/1965 | Lau . |
| 3,279,608 | 10/1966 | Soriente . |
| 3,310,175 | 3/1967 | McLagan ................................ 210/193 |
| 3,319,793 | 5/1967 | Miller, Jr. . |
| 3,327,864 | 6/1967 | Ball . |
| 3,362,535 | 1/1968 | Kasten . |
| 3,386,587 | 6/1968 | Mast . |
| 3,394,067 | 7/1968 | Shirley . |
| 3,394,815 | 7/1968 | Harms . |
| 3,407,572 | 10/1968 | Tolley ..................................... 55/283 |
| 3,447,690 | 6/1969 | Kracklauer ............................ 210/332 |

(List continued on next page.)

FOREIGN PATENT DOCUMENTS

| | | |
|---|---|---|
| 2374936 | 8/1978 | France . |
| 1310 | of 1866 | United Kingdom . |

*Primary Examiner*—W. L. Walker
*Assistant Examiner*—Richard W. Ward
*Attorney, Agent, or Firm*—Weingram & Associates, P.C.

[57] ABSTRACT

A filter tube for use in earth coated type filters includes a flexible permeable tubular sheet internally supported by a helical spring which in one embodiment extends partially along the length of the filter tube. The unsupported free end or an intermediate portion is subjected to oscillation to dislodge contaminated coating material accumulated on the surfaces of the filter sheet. External means are provided at the free end of the filter to permit oscillation and to support a plurality of filter ends. In another embodiment, an internal spring is connected between opposite ends of the filter tube to support the full length of the tube wall. One end of the tube is connected to an external spring and anchor plate. In a slack position, the tube end folds over an end collar connected to the spring. Extension of the anchor plate applies tension to stretch the spring and tube to a taut position during a cycling operation which oscillates the tube to dislodge accumulated material.

20 Claims, 8 Drawing Sheets

U.S. PATENT DOCUMENTS

| | | |
|---|---|---|
| 3,532,220 | 10/1970 | Lewis . |
| 3,576,444 | 4/1971 | Roberts . |
| 3,578,175 | 5/1971 | Manjikian . |
| 3,601,795 | 8/1971 | Shimizu . |
| 3,609,681 | 9/1971 | Saul . |
| 3,642,141 | 2/1972 | Hobson, Jr. . |
| 3,728,676 | 4/1973 | Brown . |
| 3,868,325 | 2/1975 | Otto . |
| 3,937,281 | 2/1976 | Harnsberger . |
| 4,048,075 | 9/1977 | Colvin . |
| 4,058,464 | 11/1977 | Rogers . |
| 4,063,217 | 12/1977 | Hyde . |
| 4,094,784 | 6/1978 | Hirano . |
| 4,157,900 | 6/1979 | Margraf . |
| 4,246,114 | 1/1981 | Krebs . |
| 4,292,180 | 9/1981 | Zylka . |
| 4,340,477 | 7/1982 | Hobson, Jr. . |
| 4,422,938 | 12/1983 | Miller . |
| 4,427,547 | 1/1984 | Miller . |
| 4,439,327 | 3/1984 | Muller . |
| 4,526,688 | 7/1985 | Schmidt, Jr. . |
| 4,552,661 | 11/1985 | Morgan . |
| 4,714,557 | 12/1987 | Croket . |
| 4,783,259 | 11/1988 | Wade . |
| 4,836,922 | 6/1989 | Rishel . |
| 4,836,936 | 6/1989 | Schewitz . |
| 4,859,988 | 8/1989 | Holtvluwer . |
| 4,867,771 | 9/1989 | Brennecke et al. .................. 55/378 |
| 4,872,981 | 10/1989 | Hobson, Jr. . |
| 4,878,042 | 10/1989 | Eggiman . |
| 4,919,801 | 4/1990 | Hobson, Jr. . |
| 4,944,873 | 7/1990 | Williams . |
| 5,084,176 | 1/1992 | Davis . |
| 5,114,593 | 5/1992 | Concin . |
| 5,128,032 | 7/1992 | Rosaen . |
| 5,156,749 | 10/1992 | Williams . |
| 5,202,017 | 4/1993 | Hunter . |
| 5,221,469 | 6/1993 | Nehls . |
| 5,227,076 | 7/1993 | Bogen . |
| 5,230,131 | 7/1993 | Hobson, Jr. . |
| 5,389,913 | 2/1995 | Boser . |
| 5,407,570 | 4/1995 | Hobson, Jr. . |
| 5,426,414 | 6/1995 | Flatin . |
| 5,440,288 | 8/1995 | Gottlieb . |
| 5,441,633 | 8/1995 | Schewitz . |
| 5,445,738 | 8/1995 | Fry . |
| 5,449,468 | 9/1995 | Trummel . |
| 5,482,594 | 1/1996 | Salminen . |

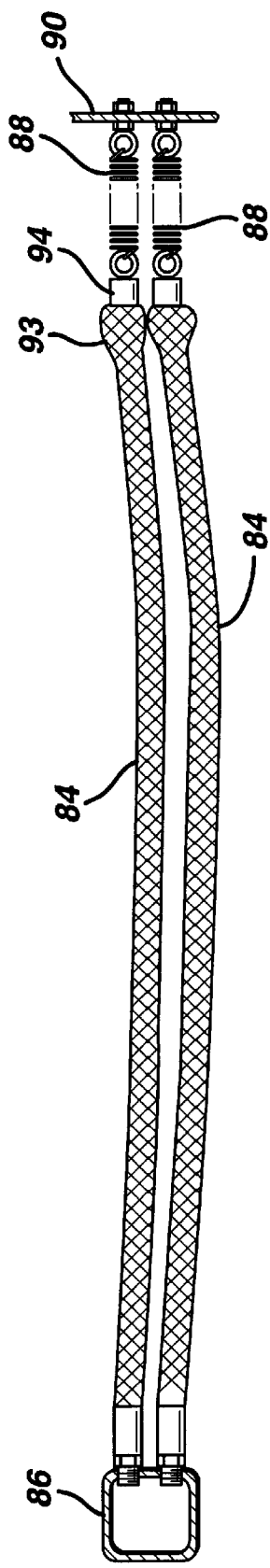
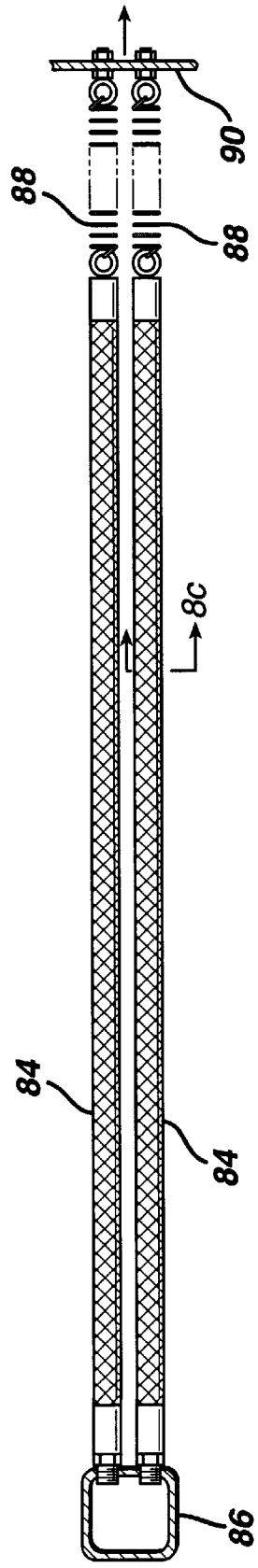
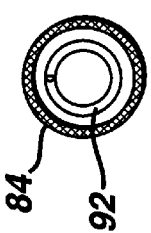
FIG. 8a
FIG. 8b
FIG. 8c

SLACK FILTER TUBE WITH TENSIONING MEANS

BACKGROUND OF THE INVENTION

1. Field of the Invention

This invention relates to filter tubes and specifically to filtering devices and filter tubes used for pressure filters employing diatomacious earth, known as bump filters.

2. Description of the Prior Art

Filter tubes utilizing earth coatings over a braided tube have met with a large degree of success in the filter industry especially for high volume fine filtering. Normally, the filter tube consists of an outer braided portion or sheet supported by an inner spring which gives the tube its shape and body. The end of the tube sheet intended to be mounted, usually has a collar device to which the outer sheet or skin of the outer filter tube is sealed and the end is closed. The opposite end of the tube sheet is closed either in the standard tube by sealing the ends or in the recyclable tube by means of a screw fastening that engages with the spring. The inside of the filter tube confines the spring which holds the skin relatively stationary during normal operations. This will enable a coating of filtering particles to build up on the outside of the tube to act to produce the filtering effect.

Examples of such prior art filters are found in U.S. Pat. Nos. 3,100,190; 3,642,141; 4,872,981; 5,230,131 and 5,407,570 to Hobson which are incorporated herein by reference.

Additional examples of prior art filters and related apparatus are shown in the following patents.

U.S. Pat. No. 2,480,320 to Carrier discloses filtering apparatus supporting a plurality of filter elements at the upper and lower ends. A spring and motor at the upper end provide oscillations for removal of sludge. The upper supporting end is removable to permit removal and replacement of filters.

U.S. Pat. No. 2,570,132 to Koupal concerns apparatus for cleaning filter elements of the air-bump wash types. Loss of air is avoided by provision of a solid wall in the inlet chamber as a more suitable air storage space. The need for airtight seals is eliminated and previous impervious upper portions of the filter elements are omitted and the full length of the filters can be used with shorter elements.

U.S. Pat. No. 2,934,209 to Franck describes a fluid dehydrator with improved filtering. The fluid to be dehydrated is passed through a shell filled with a desiccant which can be contaminated by oil in the fluid. A strainer is employed at the inlet to strain out particulate material before passing through the desiccant. A second filter at the outlet provides further filtering of the fluid passing into a second desiccant chamber.

U.S. Pat. No. 4,094,784 to Hirano discloses apparatus for filtering, dehydrating and drying suspension material. A filter mesh is supported on a rotatable valve plate in a vertical cylinder. The mesh collects a cake which is dried, vibrated and dropped through a lower opening by tilting the plate.

U.S. Pat. Nos. 4,422,938 to Miller and 4,427,547 to Miller concern a backwashing filter apparatus which utilizes an inner tapered housing to provide an annular outer flow passage that decreases from inlet to outlet. This provides a uniform liquid velocity through the filter in both forward and back flow operation. A grid support for the inner filter is formed of a plurality of ring-like segments stacked end to end.

U.S. Pat. No. 4,552,661 to Morgan describes a liquid filter device having replaceable self-retaining filtering bags which are formed to snap fit into a groove within the upper portion of the filter housing.

It has been noted that these earth filtering type of apparatus have various phases to the filtering cycle, one phase of which requires back flushing and shaking or bumping to remove the existing contaminated filtering coat and the other to then reapply the coat. During this time, it is possible for particles of dirt in the system to pass through the skin of the filter tube. Not all of these particles may pass from the filter tube beyond the tube sheet and be expelled prior to the succeeding filtering operation. Instead they may settle to the bottom of the filtering tube where they can remain until an inopportune time arises during the normal filtering cycle and then these particles will pass into the filtrate producing a contamination and a less than optimum result of the filtering process.

Heretofore in the past it has been difficult if not impossible to remove these entrapped particles of dirt from the filter and stream because they are usually at the end of the tube where the velocity stream is the lowest and there is the least agitation. The greatest velocity of particles passing through a tube will usually occur at the point near the tube support sheet.

OBJECTS AND SUMMARY OF THE INVENTION

It is therefore an object of the present invention to provide an improved filter tube having an end adapted to be attached to a tube cover sheet and another end having means for applying tension thereto.

It is another object of the present invention to provide an improved filter tube having one end which has no internal tube support and includes means for applying tension at that one end.

An additional object of the present invention is to provide an improved filter tube having internal supporting means secured between opposite ends and a slack outer wall which is stretchable under tension.

It is a further object of the present invention is to provide an improved filter tube which enables the remote end of the tube to be oscillated.

It is still another object of the present invention is to provide an improved filter tube which allows for the removal of accumulated contaminants or foreign objects from the inside of the tube.

It is also an object of the present invention to provide an improved filter tube which allows for oscillation of the tube to enable the contaminants in the tube to be flushed from the tube during the standard filter cycle.

It is also an object of the present invention to enable the tube to operate either in a vacuum environment or in a pressure environment so that the filter can work by means of a vacuum imposed on the outlet of the filter as well as by placing positive pressure on the inlet.

It is an additional object of the present invention to provide means to place the filter having an unsupported free end into tension to maintain the position and tension on the skin of the filter during normal filtering operations.

Still another object of the present invention is to provide a novel means of supporting the free end of the filter which can be used to adjust the tension of the filter during normal filtering operations and relax the tension during other phases of the filtering cycle in order to oscillate the free end of the filter.

It is a further object of the present invention to provide an improved filter tube which is durable, relatively easy to manufacture, simple in construction, provides improved filtering, and which reduces the contamination level from the filtrate.

Accordingly, the present invention provides a new and improved filter tube for use in earth type or coated type filtering processes in which in one embodiment the filter tube is internally supported between opposite ends and includes a slack outer wall which is stretchable under tension. In another embodiment, the filter tube is internally supported only partially along its length and having a free end which is capable of being manipulated, as for example by oscillating the free end in order to dislodge any quiescent contaminant material which has accumulated in the remote end of the filter tube. Additionally, once oscillation of the free unsupported end of the tube is accomplished, means are provided to support the unsupported end of the tube so that the entire tube still remains in tension as it would if it were housing a spring over the length of the tube.

Other objects and advantages will become apparent from the following description in conjunction with the accompanying drawings.

BRIEF DESCRIPTION OF THE DRAWINGS

FIGS. 8a, and 8b and 8c show slack filter tubes with no tension at one end in FIG. 8a, with tension at one end in FIG. 8b, and a sectional view in FIG. 8c showing an internal support spring.

DESCRIPTION OF THE INVENTION

Figure 1:
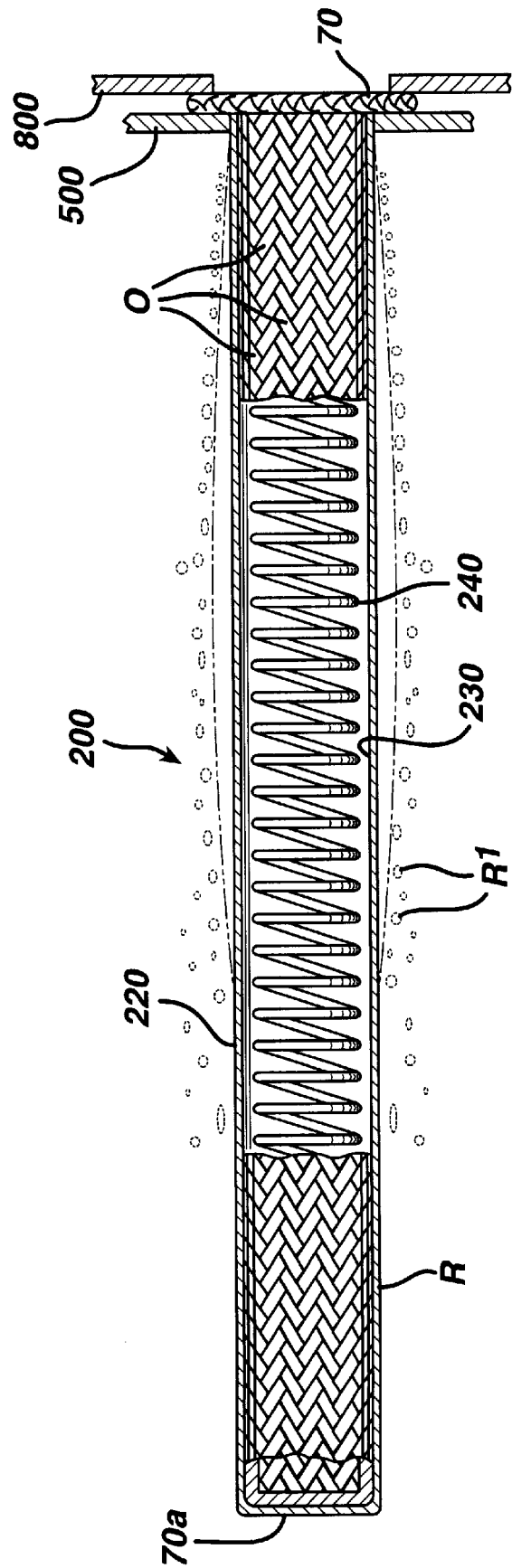
FIG. 1 shows a standard filtering tube with a internal spring supporting a skin of braided material.

Referring to FIG. 1, a prior art type filter includes a filter tube generally indicated at 200 having a skin or tube wall 220 formed of a plurality of groups of strands. Each group comprises several strands so as to form a woven helical pattern. As explained in detail in U.S. Pat. No. 3,100,190, the structure of the strands which are gathered into the groups and again woven to form the wall of the tube provides a porous surface through which filtering aids, either diamtomaceous earth or a pearl-like cellulose material are applied.

As described in U.S. Pat. No. 3,100,190, the filter tubes are of a predetermined normal diameter and length having their ends opposite the inlet flanges closed and having their side walls so constructed that the tubes will change in length and in diameter in response to changes in the pressure of the backwash liquid and thereby loosen the accumulated layer of diatomaceous earth or similar "filter aid" from the wall of the tube and cause the dislodged layer to fall away from the tube by gravity. More particularly, the filter tube including portions of its side wall on which the layer of powder accumulates shall be capable of movement relative to other portions of said wall under the pressure of the backwash liquid so that the relative movement of said wall portions disengages the accumulated layer of "filter aid" from the tube. The filter tube is formed of interlaced or braided wires that extend helically in the tube wall at angles to a diametral plane of the wall, i.e. a plane perpendicular to the axis of the tube, such that when there is a liquid pressure differential between the inside and the outside of the tube, the wall of the tube either will be elongated and decreased in diameter or shortened and increased in diameter, depending upon the angular relation of the wires to said diametral plane and whether the higher pressure is on the inside or the outside of the tube.

While the construction of the tube wall may be varied, one preferred form comprises wires woven in generally known manner with a so-called "basket" weave in which a plurality of groups of wires, each group including a plurality of wires, for example twelve, of small diameter, for example 0.008 inch, are braided with the wires running helically of the tube wall and with the groups of wires braided in the so-called "plain" or "over two-under two weave," which is frequently used in making tubular braids such as are applied to wires or hose. For convenience in manufacture, the wires may be initially braided on known machines so that the angle of the wires of each group of wires with said diametral plane of the tube is about 35° 16' so as to balance the end and side wall pressures and produce a stable construction which will neither swell nor elongate under pressure. This angle is sometimes called the "neutrality" angle. While the diameter of the tube may vary, a desirable tube is initially formed with a diameter of about 1–¼ inches, and the tube is then drawn through a die to reduce its diameter to about 7/16 inches and at the same time rearrange the wires in tube wall to such an angle to said diametral plane that the diameter and length of the tube will change under variations in pressure on the walls of the tube. The wires may be disposed at an angle of more than 35° 16' to a diametral plane of the tube. With such a tube installed in a filter, the length of the tube will be increased and the diameter will be decreased under a pressure differential of the liquid on the tube wall with the higher pressure outside of the tube. The elongation and diminution in diameter of the tube should be limited, for example by a helical spring or a rigid perforated cylinder loosely disposed within the tube with its peripheral surface normally spaced from but abuttable by the tube surface so as to prevent total collapse of the tube. The wires and their weave are such that upon release of the tube wall from the pressure differential, the wall will automatically return or spring back to its original and normal condition.

As shown in FIG. 1, the outlet end of the filter has a flange (70) which is supported between a tube sheet in the filter housing and a hold down plate 800 which is used to hold the filter tube and also to restrain the spring 240 located inside the filter tube. The spring abuts against the bottom (70A) of the filter tube and stretches the tube. During normal operations, a coating cycle applies a fine powder such as diatomaceous earth or other filtering aid to coat the outer portion of the tube to provide the filtering effect. When the amount of particulate matter that has been collected by the filtering earth becomes sufficient to totally clog the filter, a backflush cycle is initiated in which the system is backflushed to cause the flow to reverse from the inside of the tube to the outside rather than from the outside to the inside.

The reverse flow breaks the cake of filtering aid or filtering powder and then a pre-coating cycle is started in which the system is operated and the powder is allowed to form around the filter tube. A problem that has occurred in the past is that during the pre-coating cycle or the back flushing cycle, particulate matter enters the filter tube. Since these tubes are usually positioned vertically with the output at the upper end, the particulate matter will fall to the bottom of the tube. Because of the physics of the filter tube and assuming that there is a uniform filtration rate along the length of the tube, the velocity at the output end of the tube will be substantially greater than the velocity at the end of the tube remote from the outlet and there will be tendency for a relatively quiet spot to form which with the assistance of gravity will become a settling pool for any particular matter that is located within the tube.

The back flushing operation does not remove this sediment that has accumulated at the bottom of the tube and accordingly after the new pre-coat cycle and filtering resumes, the sediment still exists and it is not unusual for portions of the sediment to migrate up into the fluid flow of the filtrate that is flowing inside the tube.

Figure 2:
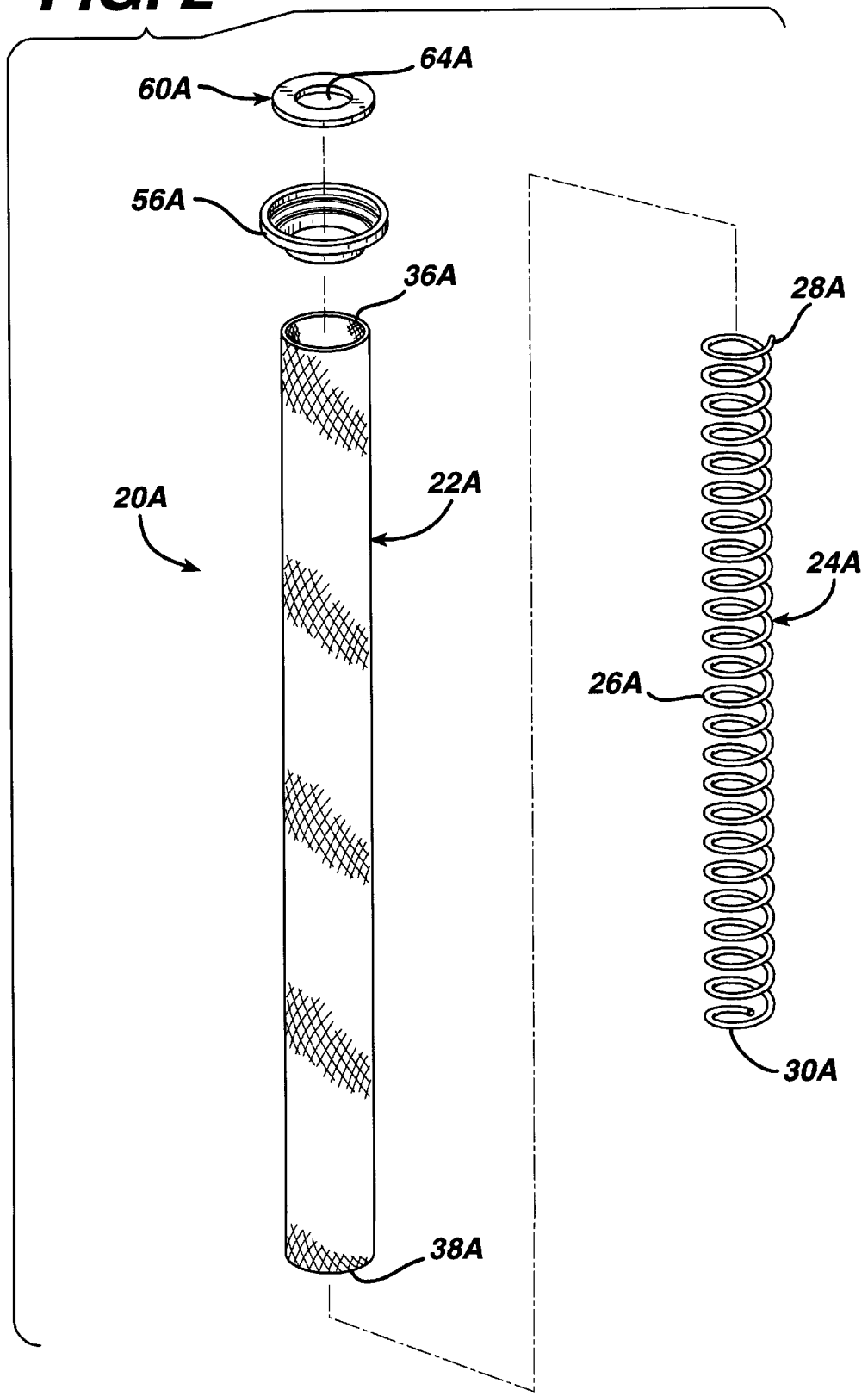
FIG. 2 shows an exploded view of the improved filtering device of a type shown in FIG. 1.

To overcome this problem, the present invention provides a means for agitating the end of the tube remote from the outlet to disturb this quiescent area and therefore to move any accumulated sediment out of this area to provide a cleaner filtered area in the tubes during the filtering cycle. FIG. 2 shows a filtering tube with one embodiment of an improved design in an exploded view.

Specifically, a filter tube generally indicated at 20A has a tube wall 22A with an internal spring generally indicated at 24A having widely pitched helical sections 26A. The outlet end of the spring 28A is adapted to rest against a washer 60A that fits into a flange 56A sealingly connected to the outlet end 36A of the tube. The end of the spring 30A remote from the outlet end 28A is substantially shorter than the length of the tube, and the end of the tube 38A is remote from the outlet end 36A.

Figure 4:
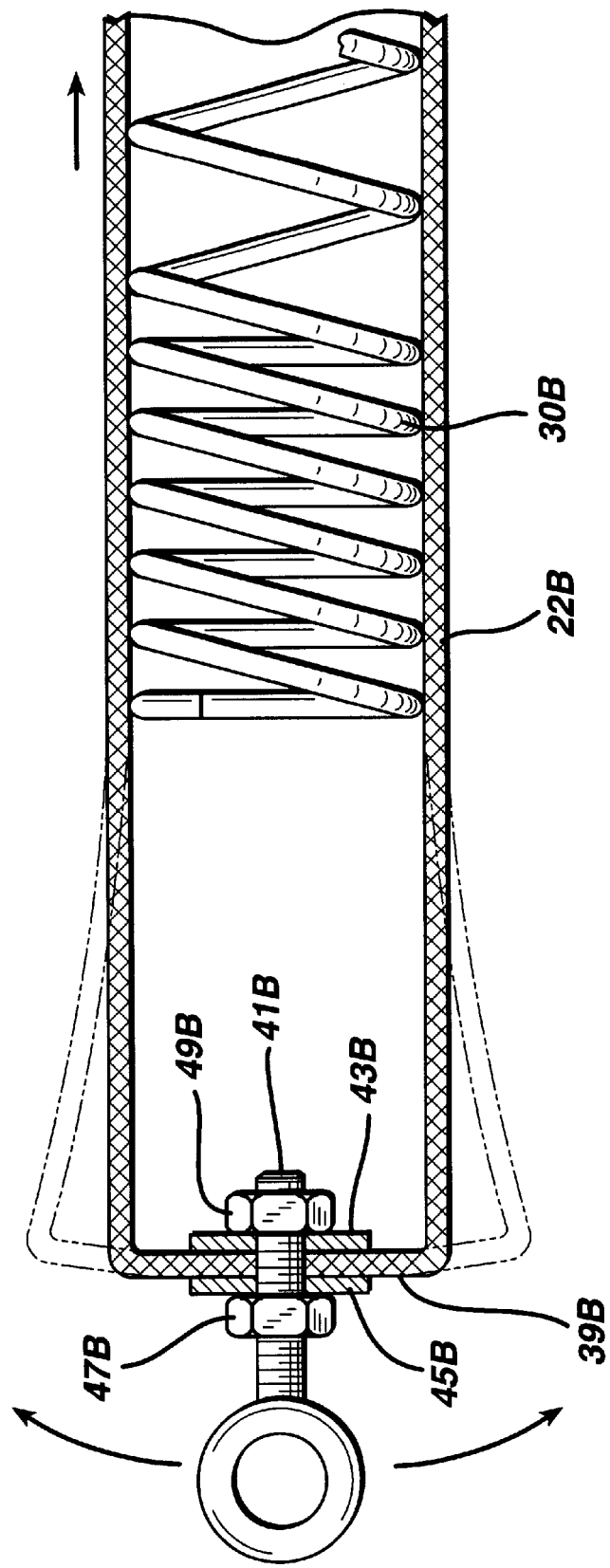
FIG. 4 is a view taken along lines 4—4 of FIG. 3.
Figure 5:
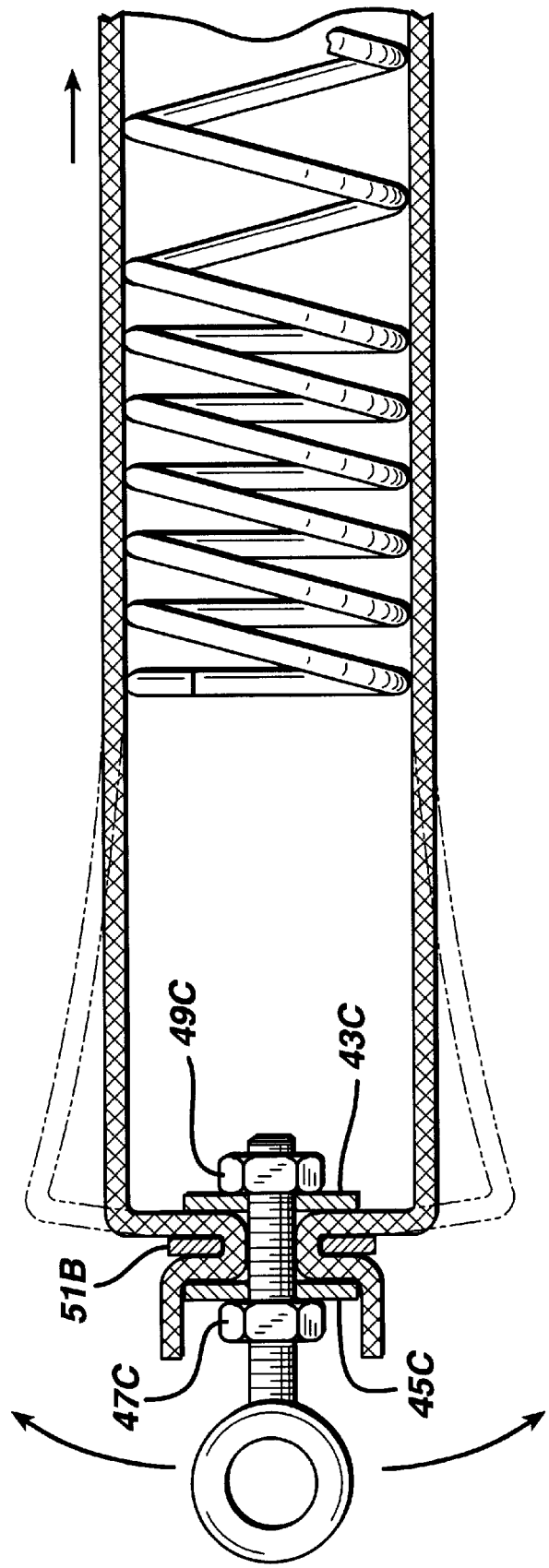
FIG. 5 is another embodiment of the invention showing a tube with a gathered end rather than a flat end.
Figure 6:
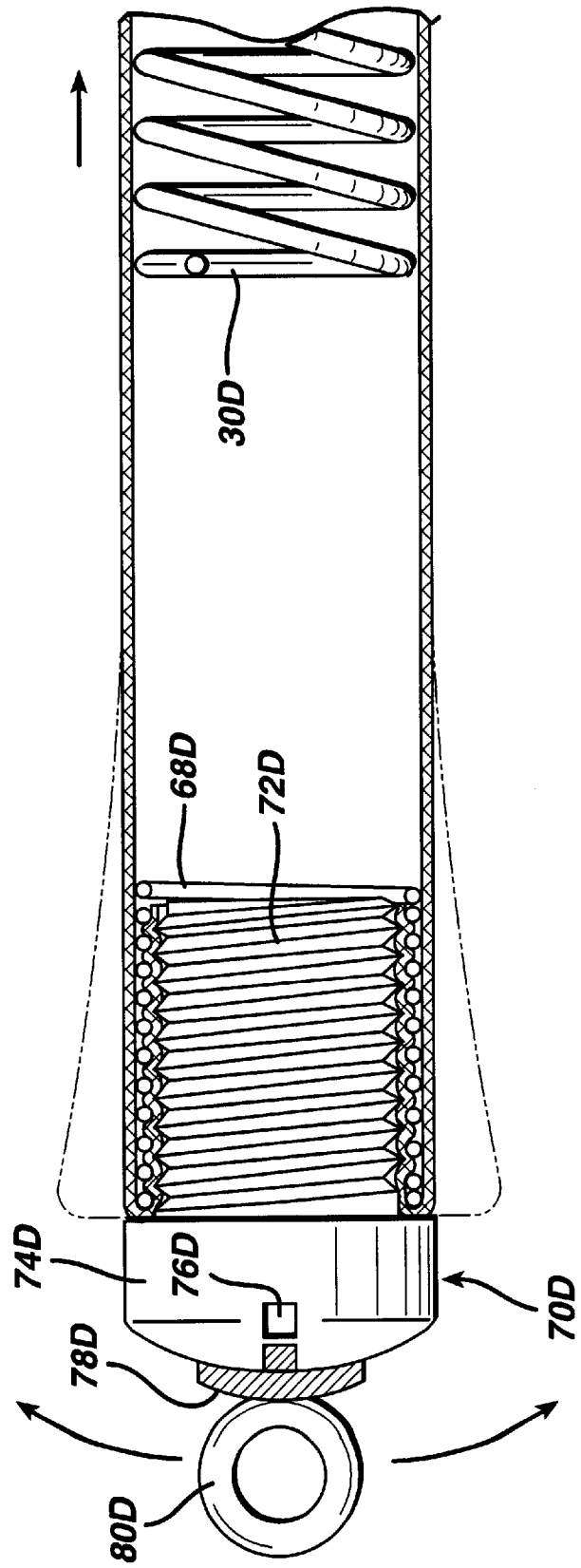
FIG. 6 shows another embodiment in which the very end portion of the filter tube is supported by a secondary spring and a portion of the tube in the lower third is unsupported internally so that oscillation at the end of the tube can be used to agitate the tube and shake the remote end of the tube to dislodge any accumulated contaminants.

Accordingly the end of the tube 38 remote from the spring end is unsupported and can be agitated by attachments to the end of the tube, as shown for example in FIGS. 4, 5 and 6.

Figure 3:
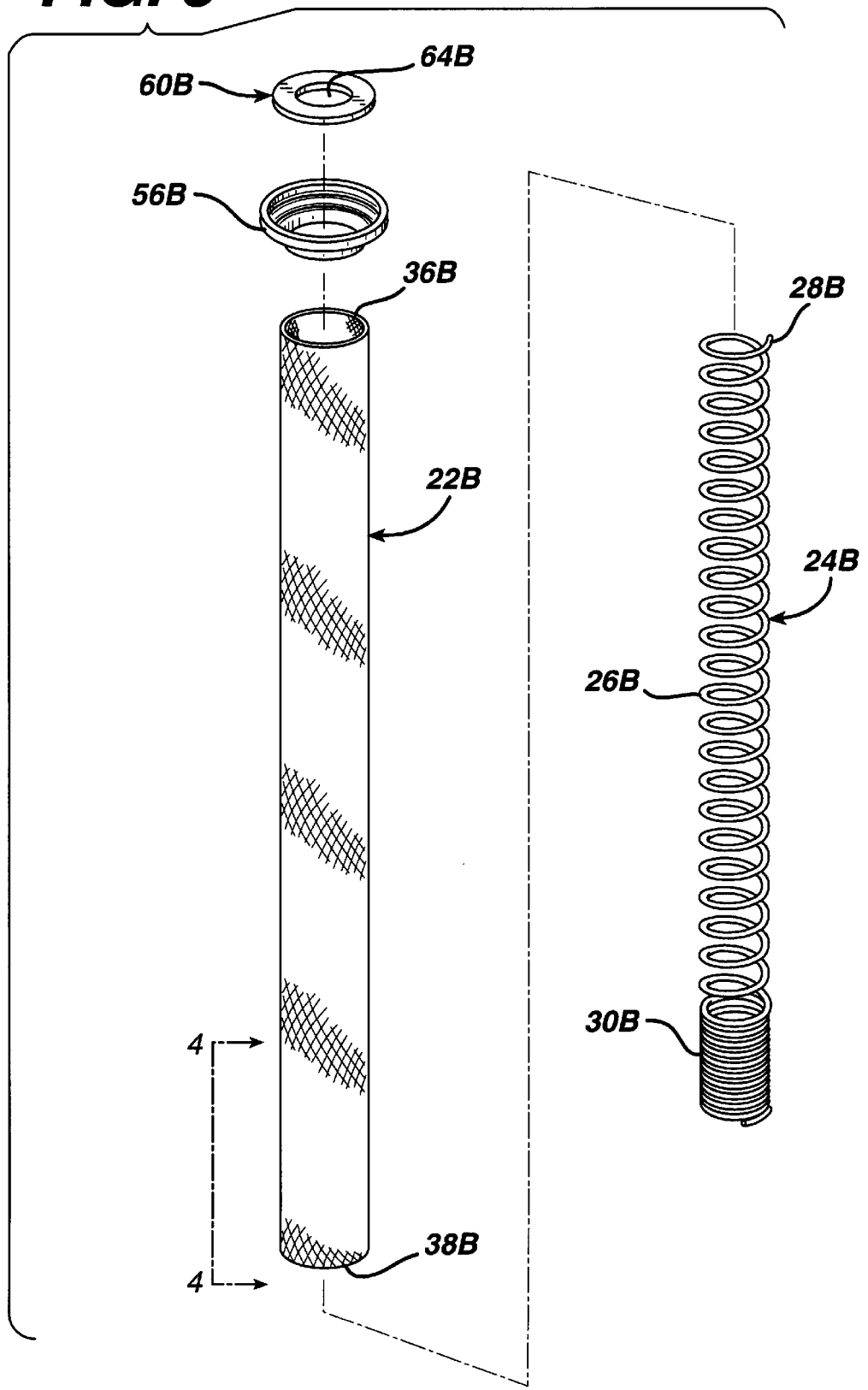
FIG. 3 shows an exploded view of a modified filter tube of the present invention.

FIG. 3 shows another embodiment of a tube similar to that in FIG. 2 with like items identified by like numbers with different suffix letters. FIG. 3 shows that the end of the spring 30B remote from the outlet end of the spring 28B has a compacted helical winding to give the free end of the spring greater body and more support for the wall of the tube 22B. The unsupported end 38B of the tube 22B is again spaced from spring end 30B. As shown in FIG. 4, the end of the tube is closed by means of a pair of washers 43B and 45B on either side of the wrapped around end 39B of the tube wall 22B. An eyebolt generally indicated at 41B has a threaded end which engages an internal locking nut 49B and an external locking nut at 47B which will squeeze the tube washers 43B and 45B to seal the end of the tube. The eye in the end of the eyebolt 41B can be used to fasten or attach the end of the filter tube to a convenient anchoring position and/or a convenient attaching means. Since the end of the tube is unsupported by the spring, it can be agitated by any external means connected to the eyebolt to shake the tube and dislodge any accumulated debris in bottom of the tube.

FIG. 5 shows another embodiment of the filter tube in which the end is sealed by means of gathering the braided wall of the tube by means of a gathering ring 51B between the internal and external washers 43C and 45C which in turn are held in place by internal and external nuts 49C and 47C, respectively.

FIG. 6 shows another embodiment of a filter tube in which the spring 30D ends substantially higher than in the previous tubes and the bottom of the tube contains a secondary spring indicated at 68D which has a compacted thread and which connects with a threaded plug generally indicated at 70D having a threaded portion 72D and a head portion 74D which will seal the end of the tube wall in a manner described more completely in U.S. Pat. No. 5,407,570 which is incorporated herein by reference.

The sealing plug 70D has a wrench passage 76D and has an eye hook 80D attached to the top of the plug by base 78D.

Figure 7:
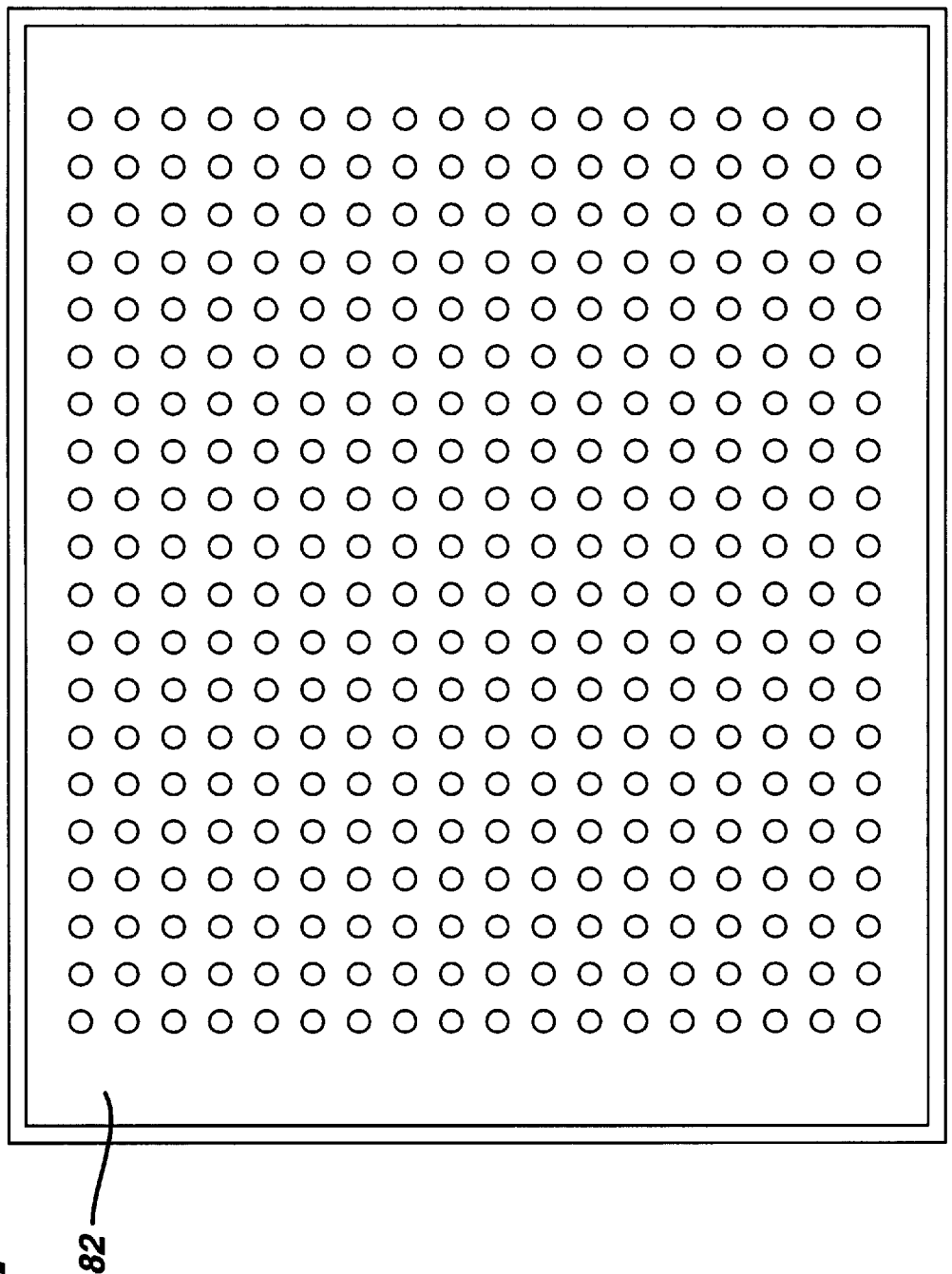
FIG. 7 shows a plan view of an anchoring plate to be attached to the remote ends of a plurality of tubes for oscillation and removal of contaminated powder.

As shown in FIG. 7, the apparatus of the present invention can be attached to a anchoring plate 82 which can be oscillated to agitate several tubes that form a filter, and which plate can then be moved towards or away from the outlet end of the filter ends or towards or away from the tube sheet to place the tubes under appropriate predetermined or controllable levels of tension during the filtering operation and appropriate levels of relaxation during the shaking or agitating operation.

Additionally, because the tubes are anchored to an anchor plate they need not be disposed vertically but can be horizontal or even inverted. Therefore, it is possible to utilize these tubes whether they are under pressure, which may be higher than atmospheric pressure on the unfiltered side of the tube sheet, or by means of a vacuum where there would be a pressure lower than atmospheric pressure on the filtered side of the tube sheet.

FIGS. 8a, 8b and 8c show another embodiment in which a pair of filter tubes include an elongated outer braided wall secured at one end to a tube sheet or manifold 86 and at the other end to a spring 88 and anchor plate 90. The tubes are supported along their entire length by an internal helical spring 92 connected to the opposite ends. As shown in FIG. 8a, the outer wall 84, spring 88 and anchor plate 90 are in a slack position with no tension applied by the 20 anchor plate on spring 88. In this position, the loose unsupported braid at end 93 of wall 84 folds over the collar 94 which is secured around the end of the braid.

During normal filtering operations, the spring 92 will be tensioned as shown in FIG. 8b by movement of the anchor plate 90 to stretch the springs 88 and elongate the filter tubes 84. Elongation of the filter tubes 84 will eliminate the slack in the outer wall 84. The tube then is a relatively straight tube which will be supported over its entire length by the helical spring 92 disposed inside the tube. In this position, the tube can then be coated with a filtering aid in the conventional manner of a filtering tube and function within a filter housing in the same manner as is well known in the prior art as shown in the United States patents already incorporated by reference.

Additionally, when it is desired to remove the filtering aid from the tube and/or to eliminate the accumulated material within the filtering tube, the anchor plate is moved towards the tube sheet or manifold shortening the length of the tube under the influence of the internal spring 92 and relaxing the external springs 88. The outer wall of the tube 84 is then in a flacid state with an accumulation on the outer wall at the gathered end of the tube 93. The tube can then be agitated by agitation of the anchor plate 90 or movement of the anchor plate causing agitation of the entire tube and the contents within the tube that would tend to cause a thorough backflushing of the internal contents of the tube into the tube sheet or manifold.

During the filtering cycle, when it is desired to operate in the normal filtering mode, the anchor plate is pulled outwardly or downwardly to apply tension to stretch spring 88 and cause tube wall 84 to stretch approximately ten percent (10%) and assume a full extended length in a taut position, as shown in FIG. 8b. About five (5) pounds of axial force per tube is applied to stiffen the elements. Internal support spring 92 is likewise extended. Anchor plate 90 may be oscillated as described in connection with FIG. 7 to control tension and relaxation applied to spring 88 and tube wall 84 during the agitation cycle.

Accordingly, as can be readily seen, these filter tubes offer numerous advantages over the prior. They avoid the accumulation of particulate matter within the filter tube, they can operate at relatively high or relatively low pressures within the tube, they can be agitated to disturb the quiescent pocket that normally forms within the tube to eliminate accumulated particulates within the tube. Additionally, they offer a more reliable and dependable method of filtering which eliminates the chance inclusion of accumulated particulate matter in the filter.

While only a limited number of embodiments have been illustrated and described, other variations may be made in the particular configuration without departing from the scope of the invention as set forth in the appended claims.

What is claimed is:

1. A filter device comprising:
   an elongated flexible fluid permeable tubular sheet including a plurality of woven groups of strands, said tubular sheet having inner and outer walls and an output end and a remote end;
   a coating of filter aid material on the outer walls of said tubular sheet for collecting fluid contaminants;
   an inner helical spring for supporting a first portion of the inner walls of said sheet anchored at said output end and extending toward said remote end of said tubular sheet, said spring having a length which is substantially shorter than the length of said sheet when said sheet is in an axially extended condition;
   an outlet flange at said output end of said tubular sheet securing and supporting said sheet;
   means connected at said remote end to tension and detension the tubular sheet to cause axial tension and axial retraction of said tubular sheet;
   and means enclosing said remote end of said sheet including means for securing and holding said remote end and for connecting to said means to tension and detension said tubular sheet and to permit movement of said remote end and removal of said filter aid material and fluid contaminants;
   wherein a second portion of the inner walls of said sheet located between said first portion and said enclosing means is unsupported such that said unsupported second portion can be agitated by attachments to the remote end of the tubular sheet.

2. A filter device comprising:
   an elongated flexible permeable tubular sheet having inner and outer walls and an output end and an opposite remote end;
   means connected to said remote end to axially extend and contract the elongated flexible permeable tubular sheet;
   an inner resilient tubular support for supporting a first portion of the inner walls of said sheet anchored at said output end and extending toward said opposite end of said tubular sheet, said tubular support having a length which is substantially shorter than the length of said sheet when said sheet is in an axially extended condition;
   an outlet flange at said output end of said tubular sheet securing and supporting said sheet; and
   means enclosing said remote end of said sheet and being connected to said means to axially extend and contract said tubular sheet;
   wherein a second portion of the inner walls of said sheet located between said first portion and said enclosing means is unsupported such that said unsupported second portion can be agitated by attachments to the remote end of the tubular sheet.

3. The filter device of claim 2, wherein said inner tubular support is a helical spring.

4. The filter device of claim 3, wherein said helical spring includes a first widely pitched winding, and a second tightly compressed winding.

5. The filter device of claim 3, wherein said helical spring has a widely pitched winding extending from said outlet flange along said tubular sheet.

6. The filter device of claim 3, wherein said tubular sheet includes a coating of filter aid material for filtering contaminated fluids passing through said tubular sheet.

7. The filter device of claim 6, wherein said means enclosing said remote end includes means for securing and holding said remote end to permit movement of said remote end and removal of said filter aid material and fluid contaminants.

8. The filter device of claim 7, wherein said means for securing and holding said remote end include an eye-bolt passing through said remote end, and means for securing said eye-bolt to said remote end.

9. The filter device of claim 8, wherein said means for securing said remote end includes an inner washer and nut and an outer washer and nut, said remote end being secured between said inner and outer washers and nuts, said eye bolt engaging said inner and outer nuts and sealing said remote end between said washers.

10. The filter device of claim 9, wherein said means for securing said remote end includes a gathering ring, said remote end passing through said gathering ring around said outer washer and nut, said eye bolt engaging said inner and outer nuts and sealing said remote end within said ring between said washers.

11. The filter device of claim 7, wherein said means for holding and securing said remote end includes a movable anchor plate for anchoring and supporting a plurality of tubular sheets and permitting movement of a plurality of remote ends.

12. The filter device of claim 7, wherein said means for securing and holding said remote end applies an adjustable tension to said remote end.

13. The filter device of claim 6, wherein said tubular sheet includes a plurality of groups of helically wound strands.

14. The filter device of claim 6, including a plate for securing and supporting a plurality of outlet flanges of a plurality of tubular sheets.

15. The filter device of claim 2, wherein said tensioning means includes resilient means having one end connected to said means enclosing said remote end and being extensible between a slack position and a taut position;
   anchoring means connected to the opposite end of said resilient means,
   said anchoring means being movable to extend said resilient means from a slack to a taut position and to return to a slack position and causing said tubular sheet including said unsupported portion to extend from said slack position to said taut position and return to said slack position.

16. The filter device of claim 15, including a plate for securing and supporting a plurality of outlet flanges of a plurality of tubular sheets.

17. The filter device of claim 16, wherein said anchoring means includes a movable plate for anchoring a plurality of resilient means.

18. The filter device of claim 15, wherein said inner resilient tubular support is a helical spring.

19. The filter device of claim 15, wherein said elongated flexible permeable tubular sheet includes a plurality of groups of strands wound in a helical pattern.

20. The filter device of claim 19, including a coating of filter aid material on said tubular sheet.

* * * * *